United States Patent
Asif Bashir et al.

(10) Patent No.: US 11,881,237 B1
(45) Date of Patent: Jan. 23, 2024

(54) CROSS TRACK CURRENT DESIGN FOR ENERGY ASSISTED MAGNETIC RECORDING

(71) Applicant: Western Digital Technologies, Inc., San Jose, CA (US)

(72) Inventors: Muhammad Asif Bashir, San Jose, CA (US); Edward Hin Pong Lee, San Jose, CA (US); Amanda Baer, Campbell, CA (US); Aron Pentek, San Jose, CA (US); Zhigang Bai, Fremont, CA (US); Yunfei Ding, Fremont, CA (US); James Terrence Olson, San Jose, CA (US); Alexander Goncharov, Morgan Hill, CA (US); Petrus Antonius Van Der Heijden, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/456,440

(22) Filed: Nov. 24, 2021

(51) Int. Cl.
 *G11B 5/11* (2006.01)
 *G11B 5/127* (2006.01)
 (Continued)

(52) U.S. Cl.
 CPC .............. *G11B 5/315* (2013.01); *G11B 5/11* (2013.01); *G11B 5/1278* (2013.01); *G11B 5/235* (2013.01);
 (Continued)

(58) Field of Classification Search
 None
 See application file for complete search history.

(56) References Cited

U.S. PATENT DOCUMENTS

| 6,201,653 B1 | 3/2001 | Contreras et al. |
| 7,212,367 B2 | 5/2007 | Clinton et al. |
| (Continued) | | |

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

Katayama et al. "Model Analysis of Tilted Spin-Torque Oscillator With Magnetic Write Head for Shingled Microwave-Assisted Magnetic Recording," IEEE Transactions on Magnetics, vol. 50, No. 11, Nov. 2014, 4 pages.

(Continued)

*Primary Examiner* — Craig A. Renner
(74) *Attorney, Agent, or Firm* — PATTERSON + SHERIDAN, LLP; Steven H. VerSteeg

(57) ABSTRACT

The present disclosure is generally related to a magnetic recording device comprising a magnetic recording head having a current flow in a cross-track direction around a main pole. The magnetic recording device comprises a main pole disposed between a trailing shield, a leading shield, and side shields. A trailing gap is disposed between the main pole and the trailing shield. A hot seed layer is disposed between the trailing gap and the trailing shield. A first insulation layer is disposed between the hot seed layer and the trailing shield, where the first insulation layer contacts the side shields. A second insulation layer is disposed between the main pole and leading shield, where the second insulation layer contacts the side shields. The first and second insulation layers direct the current through the side shields and across the main pole in a cross-track direction.

20 Claims, 13 Drawing Sheets

(51) Int. Cl.
  *G11B 5/235* (2006.01)
  *G11B 5/31* (2006.01)
  *G11B 5/21* (2006.01)
  *G11B 5/00* (2006.01)

(52) U.S. Cl.
  CPC ............ *G11B 5/314* (2013.01); *G11B 5/3116* (2013.01); *G11B 5/3133* (2013.01); *G11B 5/3146* (2013.01); *G11B 5/21* (2013.01); *G11B 2005/0024* (2013.01)

(56) References Cited

U.S. PATENT DOCUMENTS

| | | |
|---|---|---|
| 7,593,184 B2 | 9/2009 | Clinton et al. |
| 7,724,469 B2 | 5/2010 | Gao et al. |
| 7,848,054 B2 | 12/2010 | Hsiao et al. |
| 8,179,747 B1 | 5/2012 | Mugino et al. |
| 8,411,390 B2 | 4/2013 | Franca-Neto et al. |
| 8,472,135 B1 | 6/2013 | Kusukawa et al. |
| 8,547,656 B2 | 10/2013 | Igarashi et al. |
| 8,547,661 B2 | 10/2013 | Bai |
| 8,582,240 B1 | 11/2013 | Chen et al. |
| 8,587,900 B2 | 11/2013 | Franca-Neto et al. |
| 8,705,206 B1 | 4/2014 | Maeda et al. |
| 8,724,242 B2 | 5/2014 | Gao |
| 8,724,259 B1 | 5/2014 | Liu et al. |
| 8,737,006 B2 | 5/2014 | Livshitz et al. |
| 8,786,984 B2 | 7/2014 | Das et al. |
| 8,929,030 B2 | 1/2015 | Hou et al. |
| 8,988,826 B2 | 3/2015 | Sugiyama et al. |
| 8,995,088 B1 | 3/2015 | Boone et al. |
| 9,001,465 B1 | 4/2015 | Shimizu et al. |
| 9,019,646 B2 | 4/2015 | Rausch et al. |
| 9,159,339 B2 | 10/2015 | Scholz et al. |
| 9,230,571 B1 | 1/2016 | Chen et al. |
| 9,275,672 B2 | 3/2016 | Shiroishi et al. |
| 9,299,367 B1 | 3/2016 | Tang et al. |
| 9,355,655 B1 | 5/2016 | Udo et al. |
| 9,368,135 B2 | 6/2016 | Gao |
| 9,443,541 B1 | 9/2016 | Liu et al. |
| 9,478,242 B1 | 10/2016 | Liu et al. |
| 9,536,548 B1 | 1/2017 | Narayana |
| 9,691,416 B1 | 6/2017 | Izawa et al. |
| 9,792,933 B2 | 10/2017 | Koizumi et al. |
| 9,881,637 B1 | 1/2018 | Wilson et al. |
| 10,121,497 B1 | 11/2018 | Takahashi et al. |
| 10,181,334 B1 | 1/2019 | Song et al. |
| 10,186,284 B2 | 1/2019 | Narita et al. |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 10,388,305 B1 | 8/2019 | De Albuquerque et al. |
| 10,446,178 B1 | 10/2019 | Tang et al. |
| 10,580,441 B1 | 3/2020 | Chen et al. |
| 10,593,355 B1 | 3/2020 | Basu et al. |
| 10,706,876 B1 | 7/2020 | Rausch et al. |
| 10,777,219 B1 | 9/2020 | Asif Bashir et al. |
| 10,789,977 B1 | 9/2020 | Song et al. |
| 10,861,485 B1 | 12/2020 | Asif Bashir et al. |
| 10,867,626 B1 | 12/2020 | Li et al. |
| 10,891,974 B1 | 1/2021 | Chembrolu et al. |
| 10,957,348 B2 | 3/2021 | Bai et al. |
| 10,991,390 B2 | 4/2021 | Kobayashi |
| 11,049,515 B1 | 6/2021 | Liu et al. |
| 11,056,134 B1 | 7/2021 | Eppler |
| 11,211,082 B1 * | 12/2021 | Sasaki ..................... G11B 5/315 |
| 11,289,117 B1 * | 3/2022 | Sasaki .................. G11B 5/3967 |
| 11,508,401 B1 * | 11/2022 | Asif Bashir ........... G11B 5/315 |
| 11,557,314 B1 | 1/2023 | Asif Bashir et al. |
| 11,631,423 B2 | 4/2023 | Nakagawa et al. |
| 2003/0043490 A1 | 3/2003 | Clinton et al. |
| 2005/0280935 A1 | 12/2005 | Clinton et al. |
| 2008/0112087 A1 | 5/2008 | Clinton et al. |
| 2008/0117545 A1 | 5/2008 | Batra et al. |
| 2008/0205202 A1 | 8/2008 | Komura et al. |
| 2008/0239541 A1 | 10/2008 | Shimazawa et al. |
| 2008/0304176 A1 | 12/2008 | Takagishi et al. |
| 2009/0059423 A1 | 3/2009 | Yamada et al. |
| 2009/0109570 A1 * | 4/2009 | Scholz ................. G11B 5/1278 360/129 |
| 2009/0152119 A1 | 6/2009 | Tachibana et al. |
| 2009/0310244 A1 | 12/2009 | Shimazawa et al. |
| 2013/0114384 A1 | 5/2013 | Mochizuki et al. |
| 2013/0250456 A1 | 9/2013 | Yamada et al. |
| 2014/0139952 A1 | 5/2014 | Takeo et al. |
| 2014/0177092 A1 | 6/2014 | Katada et al. |
| 2014/0177100 A1 | 6/2014 | Sugiyama et al. |
| 2015/0092292 A1 | 4/2015 | Furukawa et al. |
| 2016/0027455 A1 | 1/2016 | Kudo et al. |
| 2016/0118065 A1 | 4/2016 | Chen et al. |
| 2017/0092304 A1 | 3/2017 | Koizumi et al. |
| 2017/0236537 A1 | 8/2017 | Murakami et al. |
| 2018/0268848 A1 | 9/2018 | Narita et al. |
| 2019/0088274 A1 | 3/2019 | Narita et al. |

OTHER PUBLICATIONS

Koga et al. "Increasing AC-Field Frequency in Microwave-Assisted Magnetic Recording," Intermag, EQ-03, 2015, 1 page.

Ludeman "Three Technologies That Make HDD Magic—Western Digital Blog." Western Digital Corporate Blog, published on Jul. 16, 2020 in TECH & PRODUCTS, 7 pages, https://blog.westerndigital.com/hdd-magic-20tb-18tb/.

Mallary et al. "Head and Media Challenges for 3 Tb/in2 Microwave-Assisted Magnetic Recording," IEEE Transactions on Magnetics, vol. 50, No. 7, Jul. 2014, 8 pages.

Zhu et al. "Microwave Assisted Magnetic Recording Utilizing Perpendicular Spin Torque Oscillator With Switchable Perpendicular Electrodes," IEEE Transactions on Magnetics, vol. 46, No. 3, Mar. 2010, pp. 751-757.

* cited by examiner

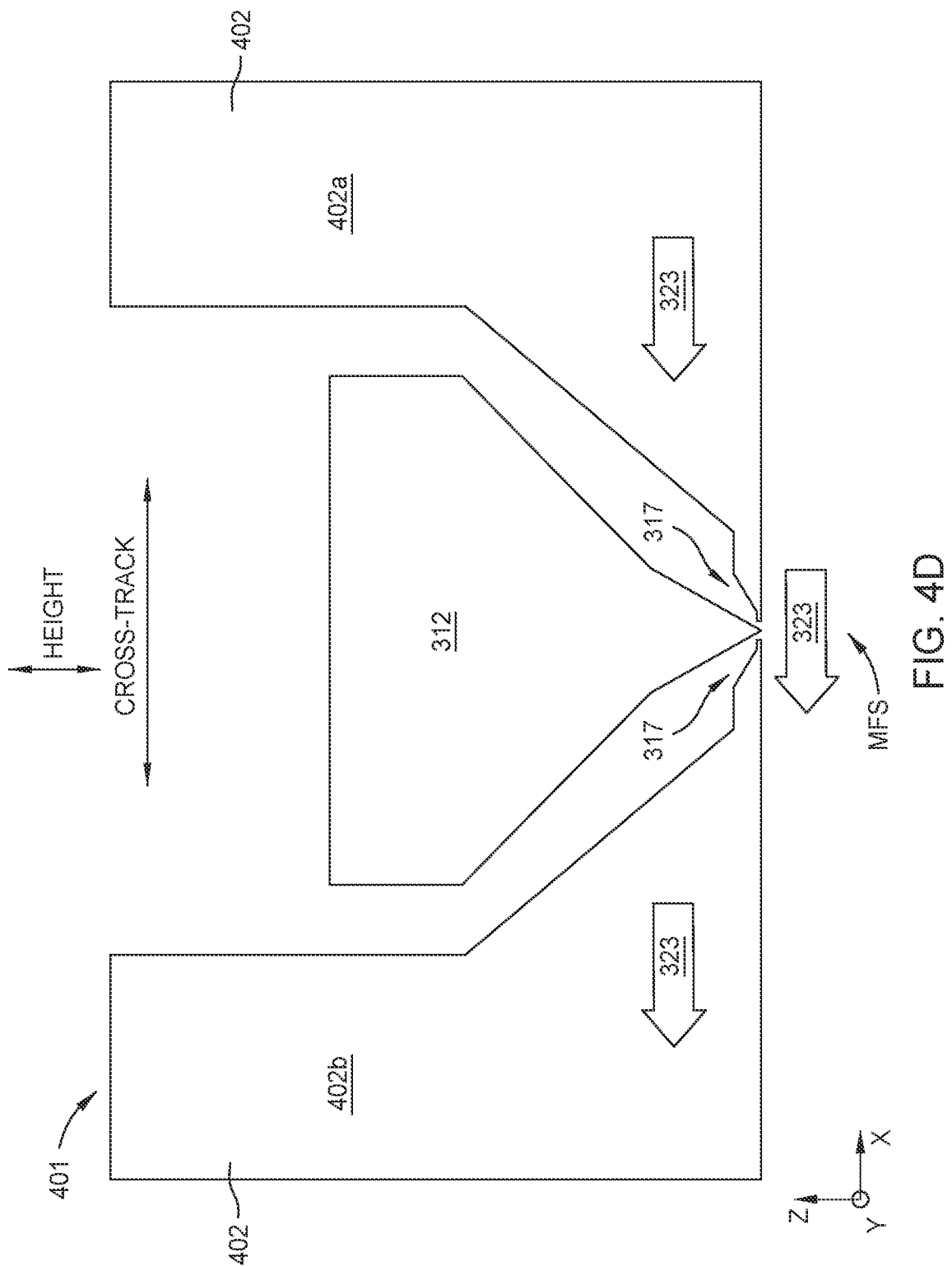

CROSS TRACK CURRENT DESIGN FOR ENERGY ASSISTED MAGNETIC RECORDING

BACKGROUND OF THE DISCLOSURE

Field of the Disclosure

Embodiments of the present disclosure are generally related to a magnetic recording device comprising a magnetic recording head having a current flow in a cross-track direction across a main pole.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to conduct the main pole edge flux for improved pole tip field and flux gradient. However, in such designs a direct current must be flown in the magnetic recording head through the spin torque oscillator stack, where the spin of an electron is inserted on a spin torque layer (STL). As the current is increased, the STL thickness must also increase, resulting in localized heating issues in the magnetic recording head. Increased magnetic recording head temperature can cause degradation at the media facing surface (MFS). The degradation can hinder performance and reliability of the magnetic recording head, and can even render the magnetic recording head inoperable. However, lowering currents can limit writing fields.

Therefore, there is a need in the art for an improved current flow in the magnetic recording head.

SUMMARY OF THE DISCLOSURE

The present disclosure is generally related to a magnetic recording device comprising a magnetic recording head having a current flow in a cross-track direction around a main pole. The magnetic recording device comprises a main pole disposed between a trailing shield, a leading shield, and side shields. A trailing gap is disposed between the main pole and the trailing shield. A hot seed layer is disposed between the trailing gap and the trailing shield. A first insulation layer is disposed between the hot seed layer and the trailing shield, where the first insulation layer contacts the side shields. A second insulation layer is disposed between the main pole and leading shield, where the second insulation layer contacts the side shields. The first and second insulation layers direct the current through the side shields and across the main pole in a cross-track direction.

In one embodiment, a magnetic recording head comprises a main pole, a trailing gap disposed above a first surface of the main pole, a hot seed layer disposed above the trailing gap, wherein the hot seed layer has a first length, a first side shield disposed adjacent to a second surface of the main pole, a second side shield disposed adjacent to a third surface of the main pole, a first insulation layer disposed above the hot seed layer, wherein the first insulation layer has a second length greater than or equal to the first length of the hot seed layer, a trailing shield disposed above the first insulation layer, a second insulation layer disposed below the first side shield and the second side shield, and a leading shield disposed below the second insulation layer.

In another embodiment, a magnetic recording head comprises a main pole disposed at a media facing surface, a trailing shield comprising a hot seed layer disposed adjacent to a first surface of the main pole at the media facing surface, a first side shield disposed adjacent to a second surface of the main pole, a first lead disposed adjacent to the first side shield, wherein the first lead is recessed a first distance from the media facing surface and set a second distance away from a third surface of the main pole, a second side shield disposed adjacent to a fourth surface of the main pole, and a second lead disposed adjacent to the second side shield, wherein the second lead is recessed a third distance from the media facing surface and spaced a fourth distance away from the second surface of the main pole, wherein during operation, the first lead and the second lead are configured to flow a current from the first side shield through the hot seed layer to the second side shield, or from the second side shield through the hot seed layer to the first side shield.

In yet another embodiment, a magnetic recording head comprises a main pole, a blocker layer disposed in contact with a first surface of the main pole, a first side shield disposed adjacent to a second surface of the main pole, a second side shield disposed adjacent to a third surface of the main pole, a hot seed layer disposed above the blocker layer, the first side shield, and second side shield, wherein the hot seed layer comprises, a first overhang portion along a cross-track direction, and a second overhang portion along a cross-track direction, a first insulation layer comprising a first portion disposed adjacent to the first overhang portion, and a second portion disposed adjacent to the second overhang portion, a trailing shield disposed above the hot seed layer and the first insulation layer, a second insulation layer disposed below the first side shield and the second side shield, wherein the second insulation layer has a greater length than the first insulation layer, and a leading shield disposed below the second insulation layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4D is illustrates a MFS cross-sectional view of a magnetic recording head assembly, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a magnetic recording device comprising a magnetic recording head having a current flow in a cross-track direction around a main pole. The magnetic recording device comprises a main pole disposed between a trailing shield, a leading shield, and side shields. A trailing gap is disposed between the main pole and the trailing shield. A hot seed layer is disposed between the trailing gap and the trailing shield. A first insulation layer is disposed between the hot seed layer and the trailing shield, where the first insulation layer contacts the side shields. A second insulation layer is disposed between the main pole and leading shield, where the second insulation layer contacts the side shields. The first and second insulation layers direct the current through the side shields and across the main pole in a cross-track direction.

Figure 1:
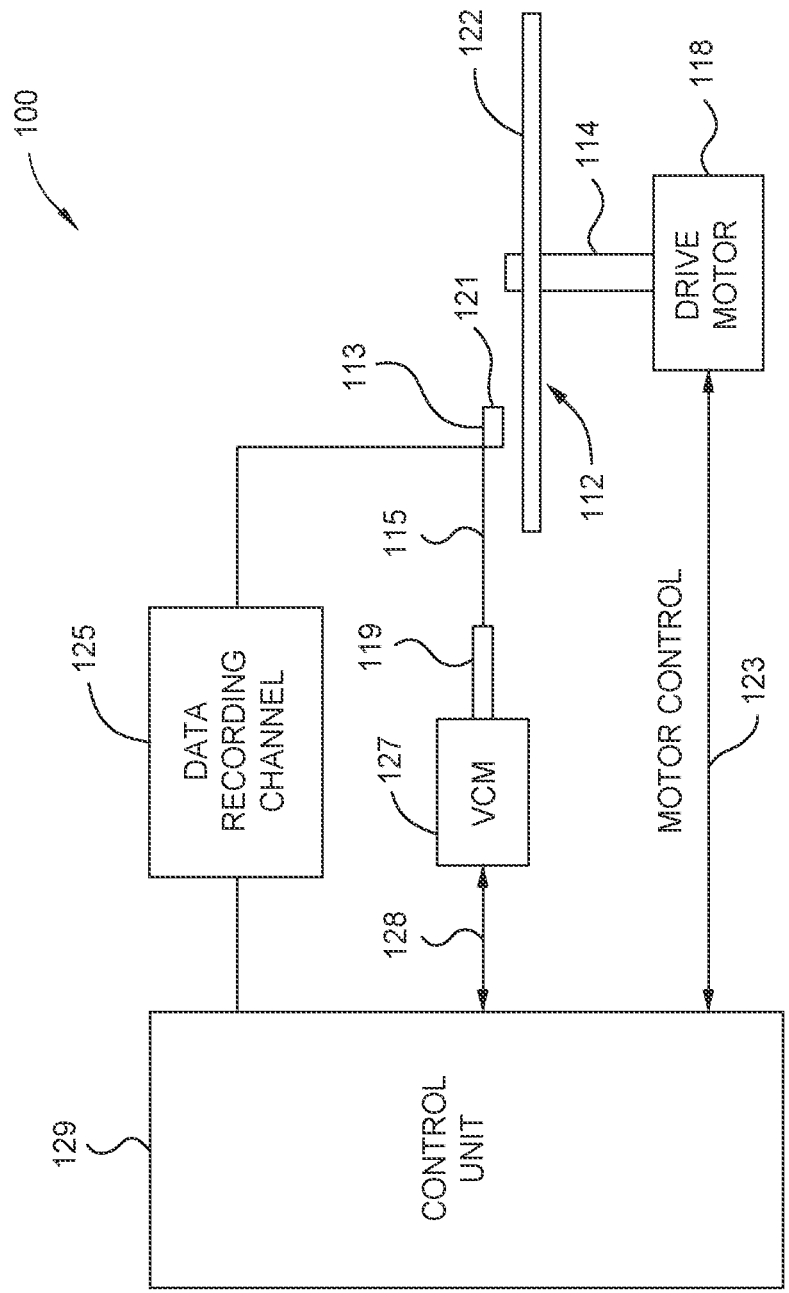
FIG. 1 illustrates a magnetic recording device embodying this disclosure.

FIG. 1 illustrates a magnetic recording device 100 embodying the disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic recording device 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 off and slightly above the magnetic media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the magnetic media 112. The AC magnetic field generated from the magnetic head assembly 121 is a bias field generated using a bias current supplied using an external AC source. The bias field facilitates enhanced writing performance of a write field generated using the write current.

The various components of the magnetic recording device 100 are controlled in operation by control signals generated by the control unit 129, such as access control signals and internal clock signals. The control unit 129 can include logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
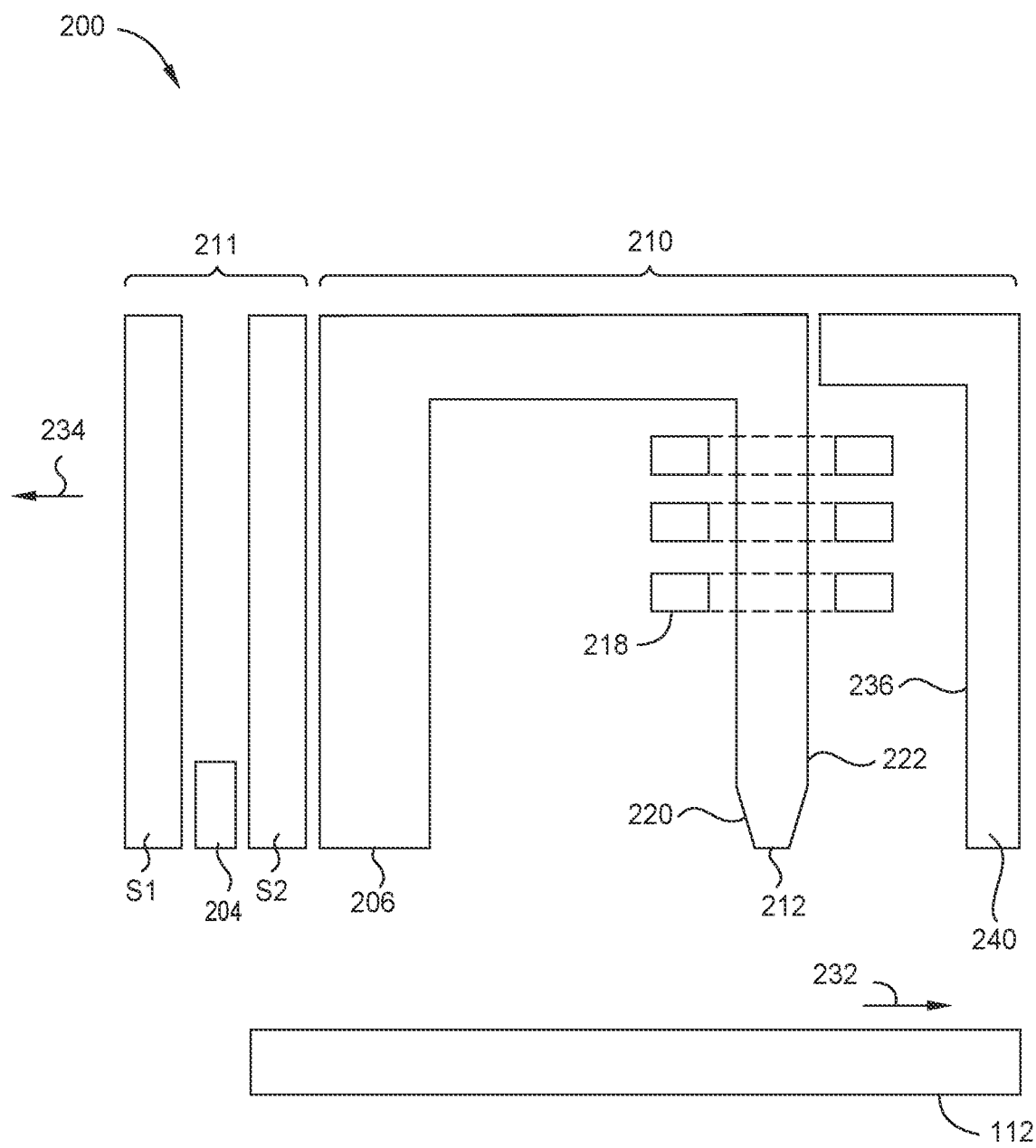
FIG. 2 is a fragmented, cross-sectional side view through the center of a read/write facing magnetic media, according to one embodiment.

FIG. 2 is a fragmented and schematic cross-sectional side view through a center of a read/write head 200 facing the magnetic media 112, according to one implementation. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 such that the read/write head 200 moves relative to the magnetic media 112 in the direction indicated by the arrow 234.

In one embodiment, which can be combined with other embodiments, the magnetic read head 211 is a magnetoresistive (MR) read head that includes an MTJ sensing element 204 located between MR shields S1 and S2. In one embodiment, which can be combined with other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap and a leading gap may be in contact with the main pole, and a leading shield may be in contact with the leading gap. A recording magnetic field (i.e., a write field or a primary field) is generated from the main pole 220 and the trailing shield 240 facilitates making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, which can be combined with other embodiments, the main pole 220 has a saturated magnetization (Ms) of 2.4 T and a thickness of about 150 nanometers (nm) to about 300 nm. The trailing shield 240 may be a magnetic material such as NiFe alloy. In one embodiment, which can be combined with other embodiments, the trailing shield 240 has an Ms of about 1.2 T to about 1.6 T.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

Figure 3A:
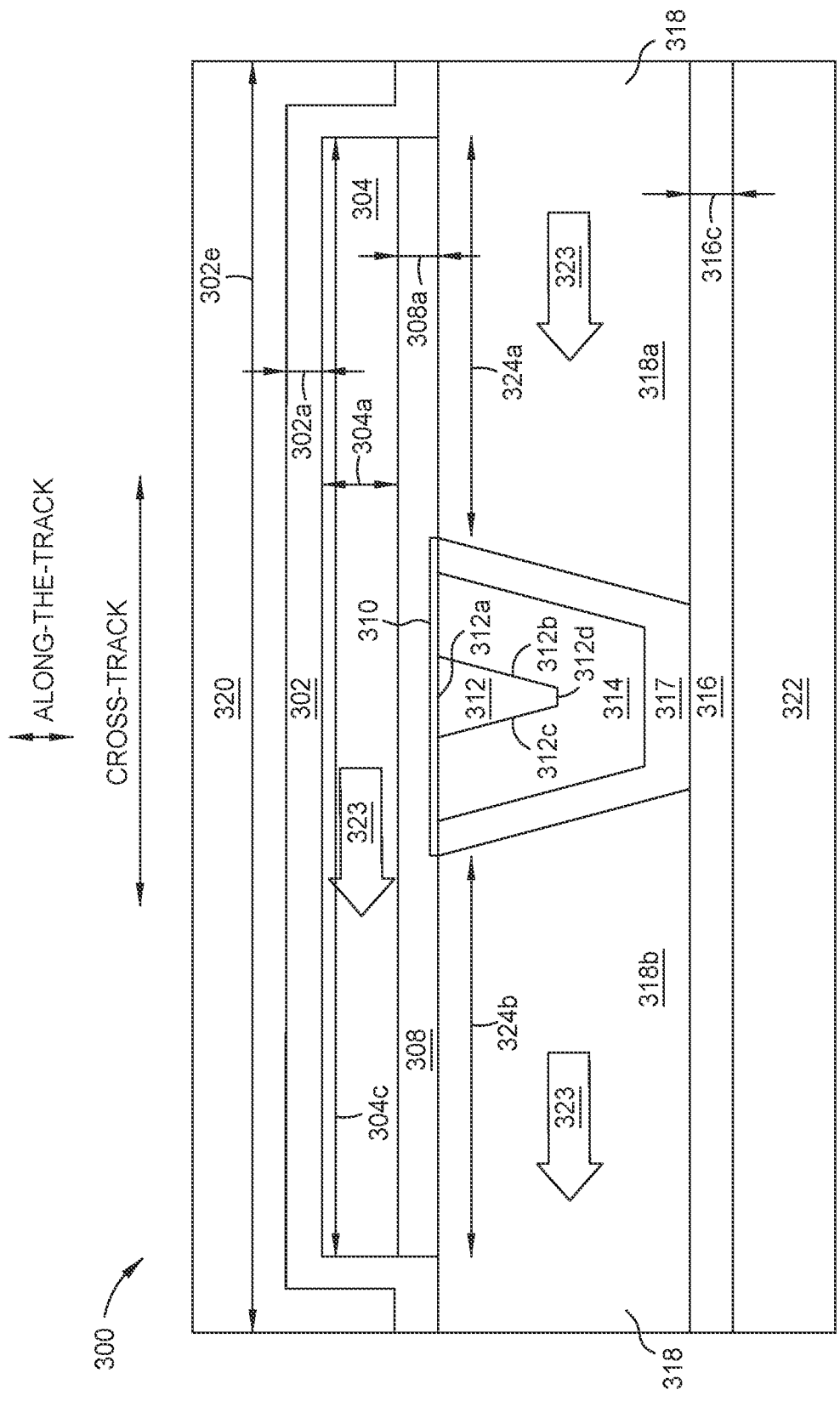
FIGS. 3A-3C illustrate various views of a magnetic recording head assembly, according to one embodiment.
Figure 3B:
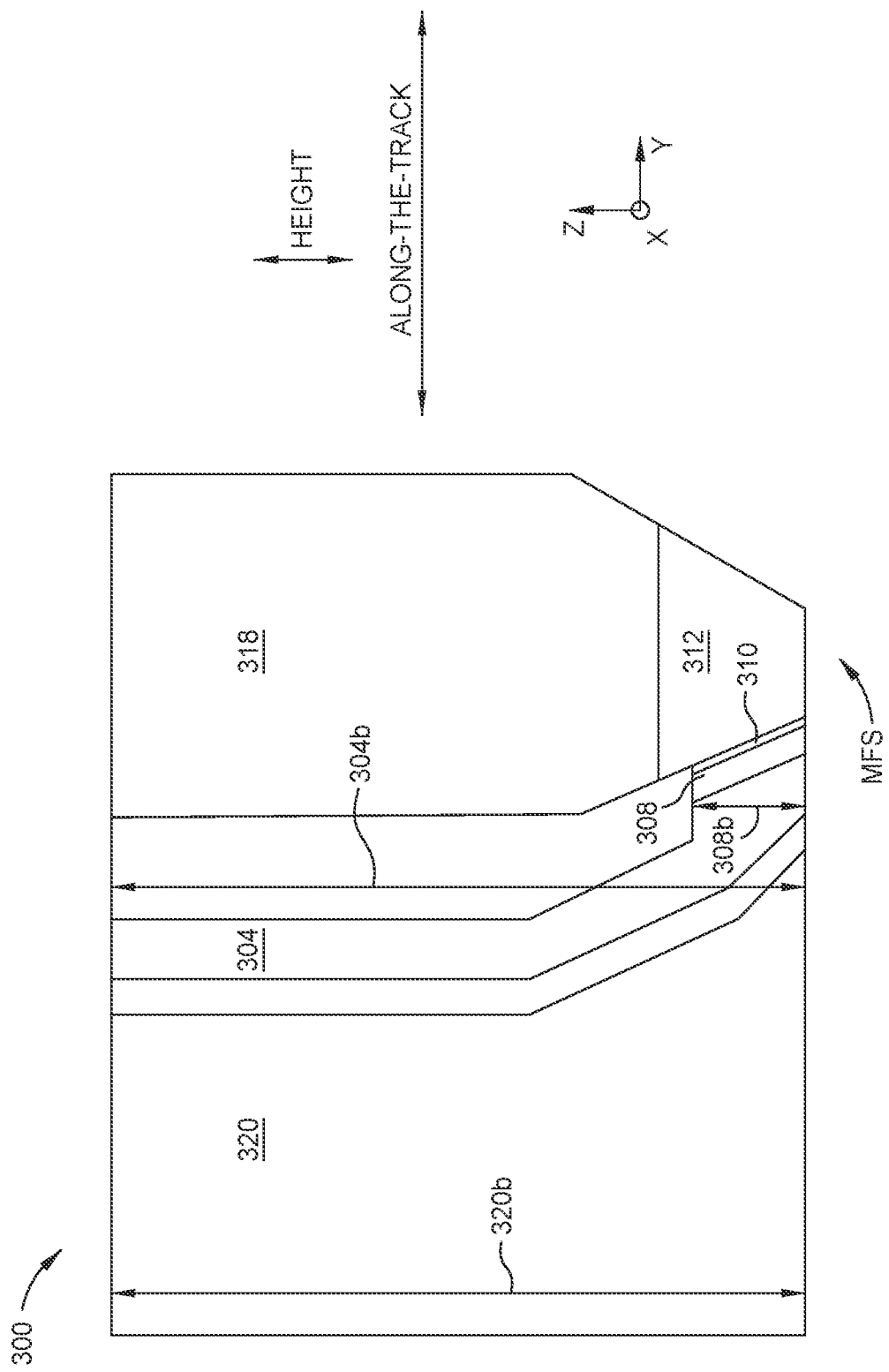
Figure 3C:
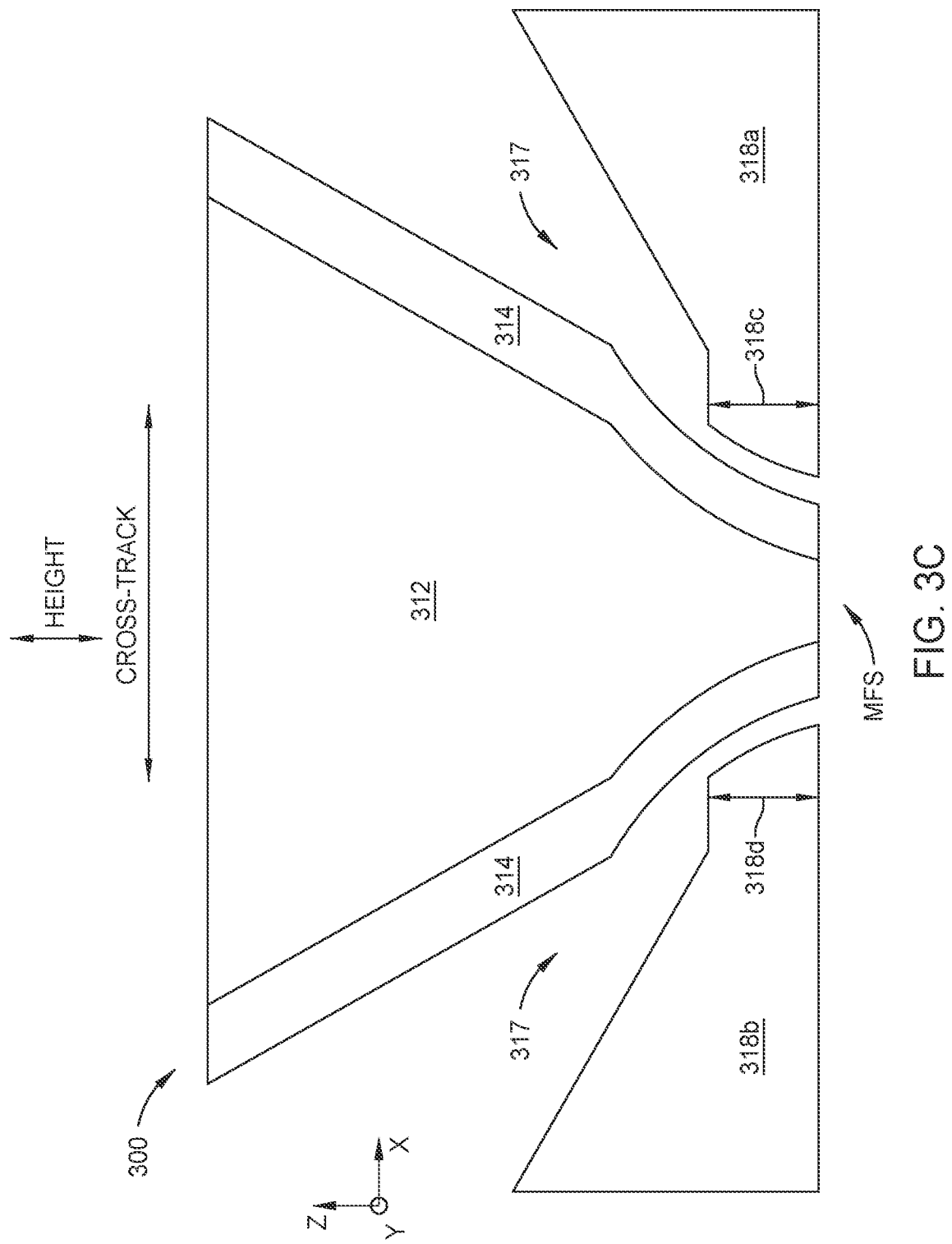

FIGS. 3A-3C illustrate various views of a magnetic recording head 300, according to one embodiment. FIG. 3A is a media facing surface (MFS) view of the magnetic recording head 300. The magnetic recording head 300 may be the write head 210 of FIG. 2. The magnetic recording head 300 may be within a magnetic recording device, such as the magnetic recording device 100 of FIG. 1.

The magnetic recording head 300 comprises a main pole 312 disposed between a trailing shield 320 and a leading shield 322 in the y-direction, and between a first side shield 318a and a second side shield 318b in the x-direction. The first side shield 318a and the second side shield 318b may be collectively referred to as the side shields 318. The trailing shield 320 is disposed adjacent to a first surface 312a of the main pole 312. The leading shield 322 is disposed adjacent to a fourth surface 312d of the main pole 312. The fourth surface 312d of the main pole 312 is disposed opposite the first surface 312a of the main pole 312 in the y-direction. The first side shield 318a is disposed adjacent to a second surface 312b of the main pole 312. The second side shield 318b is disposed adjacent to a third surface 312c of the main pole 312. The second surface 312b of the main pole 312 is disposed opposite the third surface 312c of the main pole 312 in the x-direction.

A side gap 317 is disposed adjacent to the second surface 312b of the main pole 312, the third surface 312c of the main pole 312, and the fourth surface 312d of the main pole 312. The side gap 317 surrounds the main pole 312, separating the main pole 312 from the side shields 318. A trailing gap 308, having a thickness 308a in the y-direction, of about 12 nm to about 30 nm, is disposed between the first surface 312a of the main pole 312 and the trailing shield 320. The trailing gap 308 is disposed in contact with the first surface 312a of the main pole 312. A hot seed layer 304, having a thickness 304a in the y-direction of about 20 nm to about 100 nm, and a first length 304c of about 250 nm to about 1,000 nm in the x-direction, is disposed between the trailing gap 308 and the trailing shield 320. The hot seed layer 304 is disposed in contact with the trailing gap 308. The trailing gap 308 comprises a non-magnetic, electrically conductive material selected from the group consisting of: ruthenium (Ru), copper (Cu), nickel-chromium (NiCr), copper-silver-nickel (CuAgNi), tantalum (Ta), silver (Au), a layer of an alloy thereof, and a multilayer thereof.

The trailing gap 308 and the hot seed layer 304 each comprises a first overhang portion 324a extending in the x-direction over the first side shield 318a from the side gap 317 disposed adjacent to the second surface 312b of the main pole 312, and a second overhang portion 324b extending in the x-direction over the second side shield 318b from the side gap 317 disposed adjacent to the third surface 312c of the main pole 312. A first insulation layer 302, having a thickness 302a in the y-direction of about 10 nm to about 20 nm and a length 302e of about 250 nm to about 1,000 nm in the x-direction (i.e., greater than or equal to the first length 304c of the hot seed layer 304 in the x-direction), is disposed between the hot seed layer 304 and the trailing shield 320. The first insulation layer 302 further extends in the y-direction above the first overhang portion 324a and the second overhang portion 324b to contact the hot seed layer 304 and the trailing gap 308. The first insulation layer 302 further surrounds the hot seed layer 304 and the trailing gap 308, coming into contact with the side shields 318, separating each of the hot seed layer 304, the trailing gap 308, and the side shields 318 from the trailing shield 320. A second insulation layer 316, having a thickness 316c in the y-direction of about 10 nm to about 20 nm, is disposed below the side gap 317 and in contact with the side shields 318, separating the side shields 318 and main pole 312 from the leading shield 322.

In one embodiment, the magnetic recording head 300 comprises a blocker layer 310 disposed in contact with the first surface 312a of the main pole 312. The blocker layer 310 is further disposed between the first surface 312a of the main pole 312 and trailing gap 308. The blocker layer 310 has a thickness of about 1 nm to about 10 nm in the y-direction. The blocker layer 310 extends from the first overhang portion 324a to the second overhang portion 324b above the first surface 312a of the main pole 312 and side gap 317.

The magnetic recording head 300 further comprises a heat sink 314 disposed in contact with the second surface 312b of the main pole 312, the third surface 312c of the main pole 312, and the fourth surface 312d of the main pole 312. The side gap 317 surrounds the heat sink 314 separating the heat sink 314 from the side shields 318 and the second insulation layer 316. In some embodiments, like shown in FIG. 3E, the heat sink 314 is further disposed in contact with the leading shield 322.

During operation, the magnetic recording head 300 is configured to permit current 323 to flow from the first side shield 318a through the hot seed layer 304 to the second side shield 318b, or permit the current 323 to flow from the second side shield 318b through the hot seed layer 304 to the first side shield 318a. The current 323 enters or exits the first side shield 318a through the first overhang portion 324a and enters or exits the second side shield 318b through the second overhang portion 324b. The first insulation layer 302 isolates the current 323 from the trailing shield 320 so that the current 323 will flow through the side shields 318, into the hot seed layer 304, across the first surface 312a of the main pole 312, and away from the trailing shield 320. As such, the first insulation layer 302 prevents the current 323 from flowing or dissipating into the trailing shield 320. The second insulation layer 316 isolates the current 323 from the leading shield 322 so that the current will flow through side shields 318 and away from the leading shield 322. As such, the second insulation layer 316 prevents the current 323 from flowing or dissipating into the leading shield 322. The side gap 317 directs the current 323 away from the second surface 312b of the main pole 312 and the third surface 312c of the main pole 312.

FIG. 3B illustrates a cross-sectional view of the magnetic recording head 300 shown in FIG. 3A, according to one embodiment. In the magnetic recording head 300, the trailing gap 308 has a stripe height 308b in the z-direction of about 20 nm to about 150 nm. The hot seed layer 304 has a throat height 304b in the z-direction extending from the MFS into the magnetic recording head 300 of about 200 nm to about 500 nm. The trailing shield 320 has a throat height 320b in the z-direction extending from the MFS into the magnetic recording head 300 of about 250 nm to about 500 nm.

FIG. 3C illustrates another cross-sectional view of the magnetic recording head 300 shown in FIG. 3A, according to one embodiment. In the magnetic recording head 300, the first side shield 318a has a throat height 318c in the z-direction extending from the MFS into the magnetic recording head 300 of about 50 nm to about 150 nm. The second side shield 318b has a throat height 318d in the z-direction extending from the MFS into the magnetic recording head 300 of about 50 nm to about 150 nm.

Figure 3D:
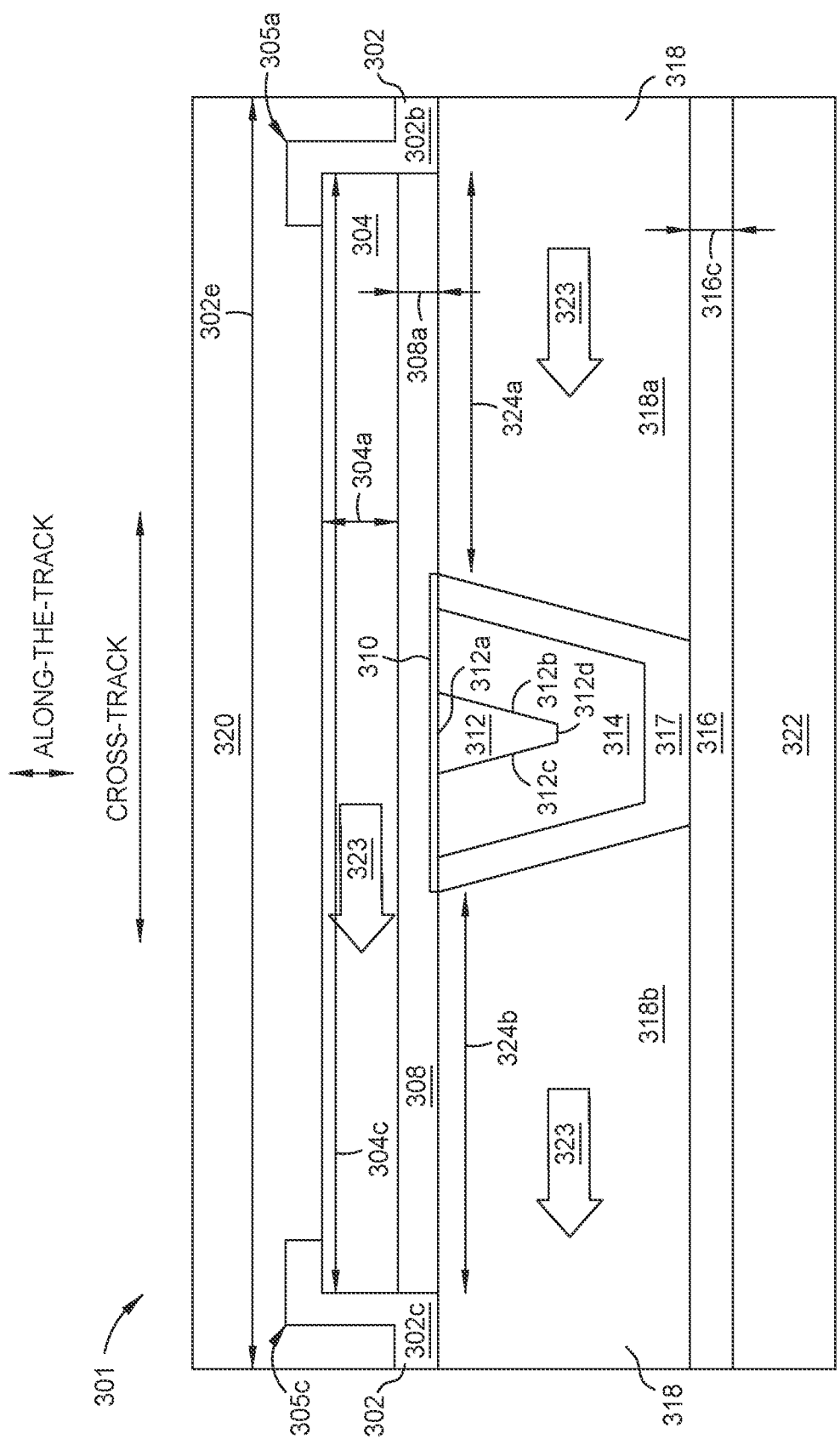
FIG. 3D illustrates a MFS cross-sectional view of a magnetic recording head assembly, according to another embodiment.

FIG. 3D illustrates a MFS view of a magnetic recording head 301, according another embodiment. The magnetic recording head 301 is the same as the magnetic recording head 300 of FIGS. 3A-3C; however, the first insulation layer 302 differs. In the magnetic recording head 301, the first insulation layer 302 comprises a first portion 302b disposed adjacent to the first overhang portion 324a, and a second portion 302c is disposed adjacent to the second overhang portion 324b. It is to be understood that although the magnetic recording head 301 is shown to comprise a blocker layer 310 like that of the magnetic recording head 300 of FIGS. 3A-3C, the magnetic recording head 301 may alternatively comprise the first surface 312a of the main pole 312 in direct contact with the trailing gap 308. The first portion 302b of the first insulation layer 302 extends from a first point 305a disposed above the first side shield 318a adjacent to the hot seed layer 304 and trailing gap 308 towards the main pole 312 first in the along-the-track direction (i.e., the y-direction) and then along the cross track direction (i.e., the x-direction) to a second point (not shown) disposed over the first side shield 318a in the x-direction. The second portion 302c of the first insulation layer 302 extends from a third point 305c disposed above the second side shield 318b adjacent to the hot seed layer 304 and trailing gap 308 towards the main pole 312 in the along-the-track direction (i.e., the y-direction) and then along the cross track direction to a fourth point (not shown) disposed over the second side shield 318b in the −x-direction.

In one embodiment, the first portion 302b of the first insulation layer 302 extends from the first point 305a to the second point (not shown) located over the first side shield 318a in the x-direction, so that the first portion of 302b of the first insulation layer 302 forms an "L" shape where no part of the first portion 302b of the first insulation layer 302 extends above (i.e., in the y-direction) the hot seed layer 304. In such an embodiment, the second portion 302c of the first insulation layer 302 extends from the third point 305c to the fourth point (not shown) located over the second side shield 318b in the −x-direction, so that the second portion of 302c of the first insulation layer 302 forms a backwards "L" shape (a mirror image to the first portion 302b of the first insulation layer 302) where no part of the second portion 302c of the first insulation layer 302 extends above (i.e., in the y-direction) the hot seed layer 304. The hot seed layer 304 contacts the trailing shield 320 between the first portion 302b and the second portion 302c of the first insulation layer 302. The second insulation layer 316 is disposed below the side shields 318 in the y-direction and has a greater length in the x-direction than the first insulation layer 302.

In another embodiment, the first portion 302b of the first insulation layer 302 extends from the first point 305a to a second point (not shown) located over the first side shield 318a in the x-direction, so that the first portion 302b of the first insulation layer 302 forms a "Z" like shape extending above at least a portion of the hot seed layer 304, like shown in FIG. 3D. The second portion 302c of the first insulation layer 302 extends from the third point 305c to a fourth point (not shown) located over the second side shield 318b in the −x-direction, so that the second portion 302c of the first insulation layer 302 forms a backwards "Z" like shape extending above at least a portion of the hot seed layer 304. At least some portion of the hot seed layer 304 contacts the trailing shield 320 between the first portion 302b and the second portion 302c of the first insulation layer 302. The second insulation layer 316 is disposed below the side shields 318 in the y-direction and has a greater length in the x-direction than the first insulation layer 302.

During operation, the magnetic recording head 301 is configured to permit current 323 to flow from the first side shield 318a through the hot seed layer 304 and the trailing shield 320 to the second side shield 318b, or permit current 323 to flow from the second side shield 318b through the hot seed layer 304 and the trailing shield 320 to the first side shield 318a. A portion of the current 323 dissipates into or flows through the trailing shield 320 where the trailing shield 320 contacts the hot seed layer 304; however, a greater portion of the current 323 (i.e., a majority) flows through the hot seed layer 304 above the first surface 312a of the main pole 312, because the first insulation layer 302 helps direct the current 323 through the side shields 318 and primarily into the hot seed layer 304. The current 323 exits or enters the first side shield 318a through the first overhang portion 324a and exits or enters the second side shield 318b through the second overhang portion 324b. The second insulation layer 316 helps direct the current 323 through side shields 318 and away from the leading shield 322. The side gap 317 helps direct the current 323 away from the second surface 312b and the third surface 312c of the main pole 312.

Figure 3E:
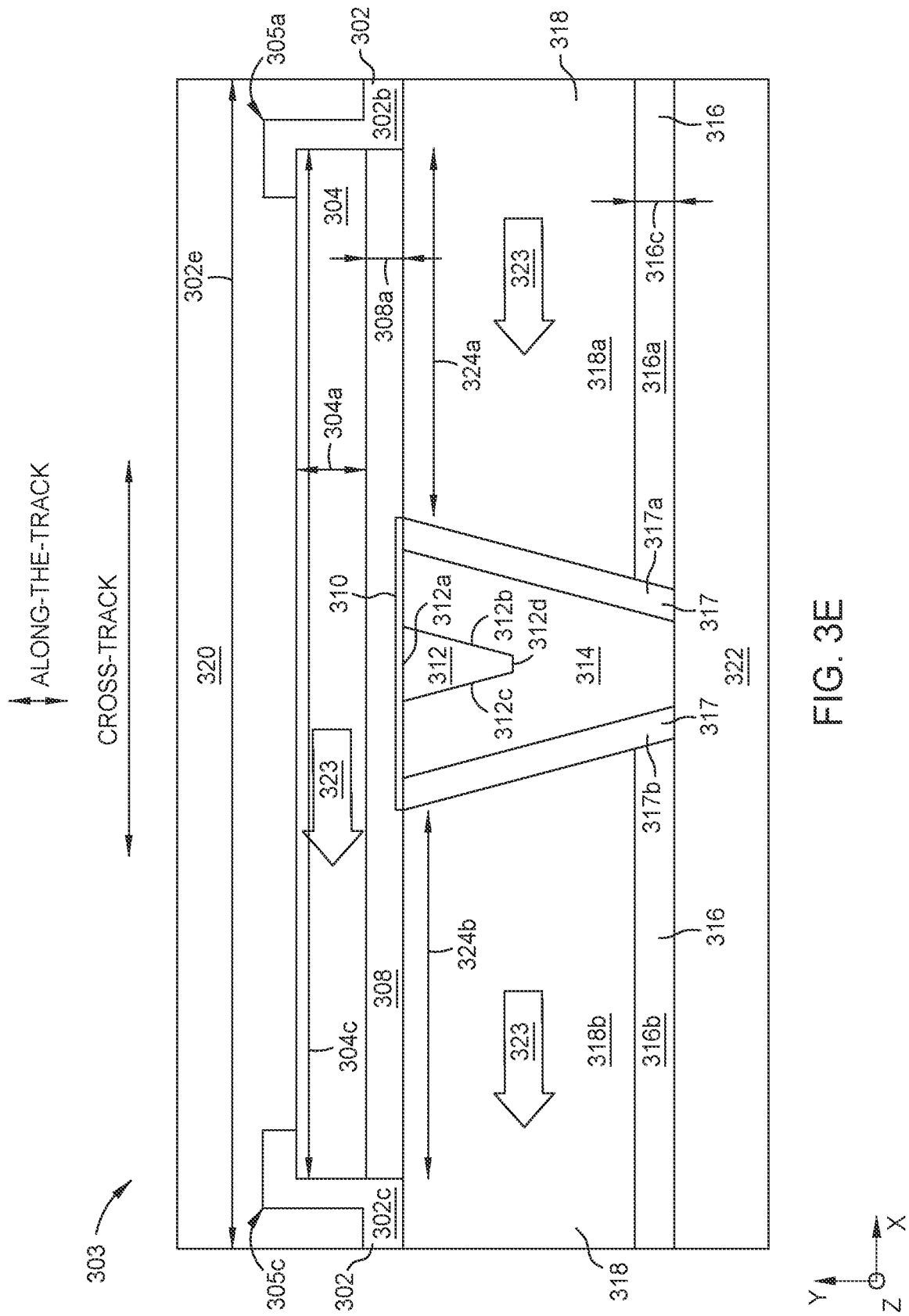
FIG. 3E illustrates a MFS cross-sectional view of a magnetic recording head assembly, according to yet another embodiment.

FIG. 3E illustrates a MFS view of a magnetic recording head 303, according another embodiment. The magnetic recording head 303 is the same as the magnetic recording head 300 of FIGS. 3A-3C or the same as the magnetic recording head 301 of FIG. 3D; however the heat sink 314 differs. In the magnetic recording head 303, the heat sink 314 is disposed in contact with the second surface 312b of the main pole 312, the third surface 312c of the main pole 312, the fourth surface 312d of the main pole 312, and the leading shield 322. As such, the heat sink 314 of the magnetic recording head 303 has a greater length in the y-direction than the heat sink 314 of the magnetic recording heads 300 and 301. The side gap 317 is thus split into two portions; a first side gap portion 317a, which is disposed between the second surface 312b of the main pole 312 and the first side shield 318a in the x-direction, and a second side gap portion 317b, which is disposed between the third surface 312c of the main pole 312 and the second side shield 318b in the x-direction. The second insulation layer 316 is also split into two portions, with a first portion 316a of the second insulation layer 316 being disposed between the first side shield 318a and the leading shield 322 in the y-direction, and a second portion 316b of the second insulation layer 316 being disposed between the second side shield 318b and the leading shield 322 in the y-direction.

It is to be understood that although the first insulation layer 302 is shown to be like that of the magnetic recording head 300 of FIGS. 3A-3C, the first insulation layer 302 may alternatively comprise the first and second portions 302b and 302c like the magnetic recording head 301 of FIG. 3D. It is also to be understood that although the magnetic recording head 303 is shown to comprise a blocker layer 310 like that of the magnetic recording head 300 of FIGS. 3A-3C, the magnetic recording head 303 may alternatively comprise the first surface 312a of the main pole 312 in direct contact with the trailing gap 308.

Figure 4A:
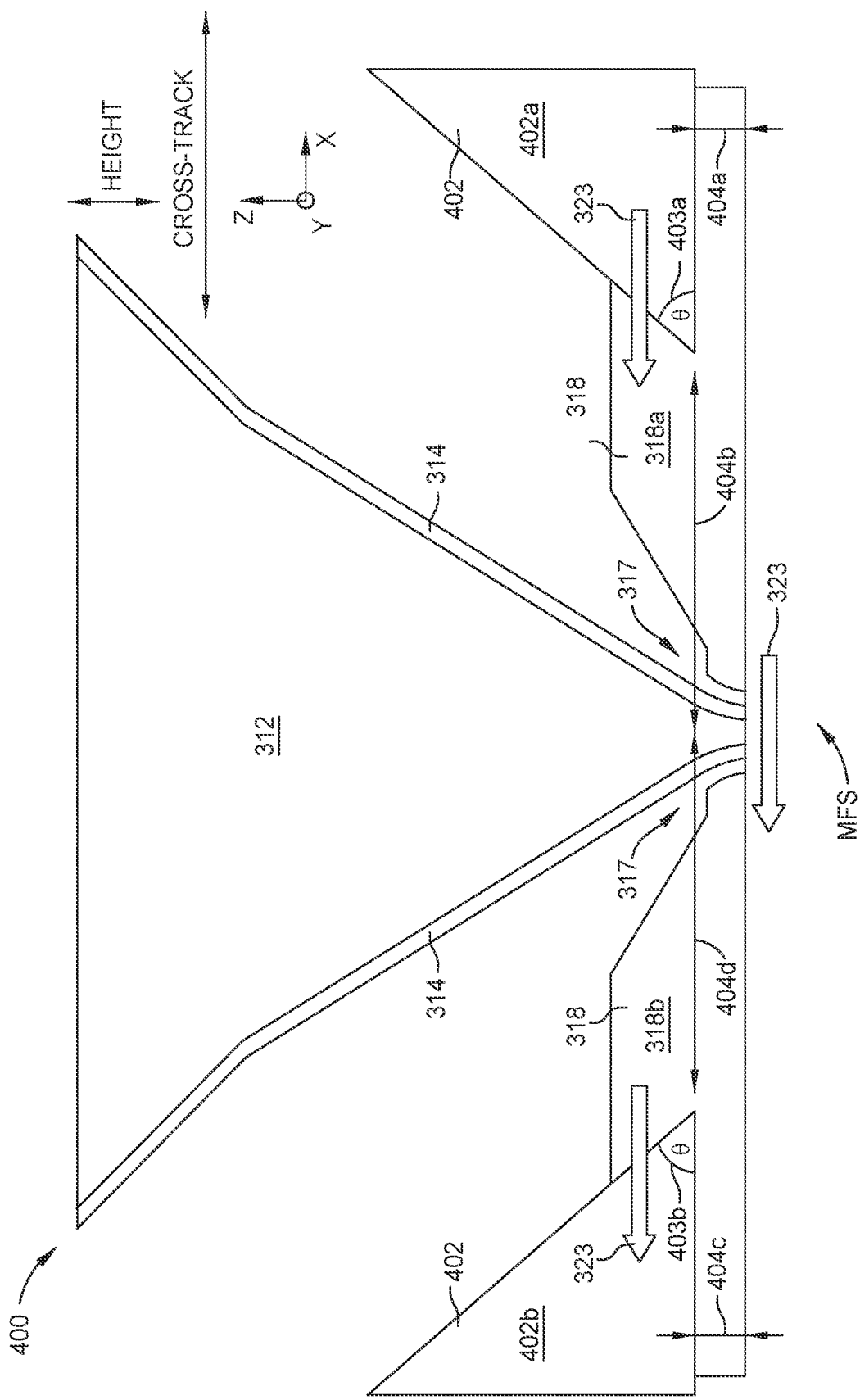
FIGS. 4A-4C illustrate various views of a magnetic recording head assembly, according to various embodiments.
Figure 4B:
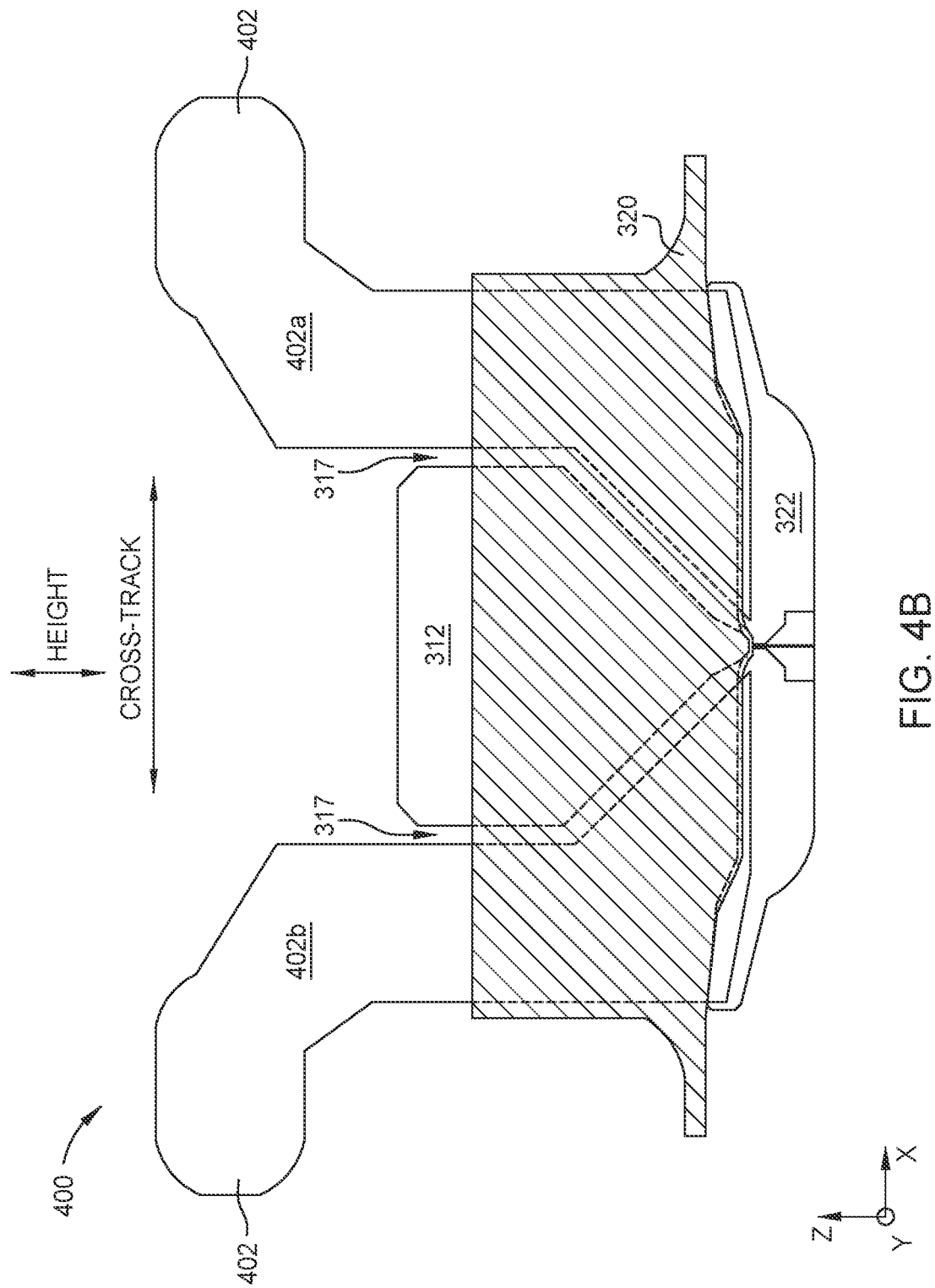

FIGS. 4A and 4B illustrate various views of a magnetic recording head 400, according to one embodiment. FIG. 4A illustrates a cross-sectional view of a magnetic recording head 400. The magnetic recording head 400 may be the write head 210 of FIG. 2. The magnetic recording head 400 may be within a magnetic recording device, such as the magnetic recording device 100 of FIG. 1. It is to be understood that the magnetic recording head 400 may comprise the magnetic recording head 300 of FIGS. 3A-3C, the magnetic recording head 301 of FIG. 3D, or the magnetic recording head 303 of FIG. 3E.

The magnetic recording head 400 comprises a main pole 312 disposed between a first side shield 318a and a second side shield 318b in the x-direction. The first side shield 318a and the second side shield 318b may be collectively referred to as the side shields 318. A heat sink 314 is disposed in contact with the second surface 312b of the main pole 312, the third surface 312c of the main pole 312, and the fourth surface 312d of the main pole 312, like shown above in FIGS. 3A-3E. A side gap 317 surrounds the heat sink 314 separating the heat sink 314 from the side shields 318.

The magnetic recording head 400 further comprises a first lead 402a disposed in contact with the first side shield 318a and a second lead 402b disposed in contact with the second side shield 318b. The first lead 402a and the second lead 402b may be collectively referred to as leads 402. The side shields 318 are formed or configured so as to allow the leads 402 to be set within and in contact with the side shields 318. The first lead 402a is recessed a first distance 404a away from the MFS of about 50 nm to about 500 nm in the z-direction, and spaced a second distance 404b away from the main pole 312 of about 500 nm to about 2500 nm in the x-direction. The second lead 402b is recessed a third distance 404c away from the MFS of about 50 nm to about 500 nm, and spaced a fourth distance 404d away from the main pole 312 of about 500 nm to about 2500 nm in the x-direction. The first lead 402a is further configured to have a first flare angle (θ) 403a of about 10 degrees to about 45 degrees relative to the MFS, and the second lead 402b is configured to have a second flare angle (θ) 403b of about 10 degrees to about 45 degrees relative to the MFS. It is to be understood that although the portion of the leads 402 which are in contact with the side shields 318 are illustrated as being approximately triangular shaped, the leads 402 may be configured in different shapes, such as approximately rectangular shaped.

As described above, during operation, the leads 402 of the magnetic recording head 400 are configured to flow a current 323 from the first lead 402a through the first side shield 318a, through the hot seed layer 304 (not shown) across the first surface 312a (not shown) of the main pole 312 through the second side shield 318b to the second lead 402b, or flow the current 323 from the second lead 402b through the second side shield 318b, through the hot seed layer 304 (not shown) across the first surface 312a (not shown) of the main pole 312 through the first side shield 318a to the first lead 402a. The first insulation layer 302 (not shown) helps direct the current 323 through the side shields 318, into the hot seed layer 304 (not shown), and away from the trailing shield 320 (not shown). The second insulation layer 316 helps direct the current 323 through side shields 318 and away from the leading shield 322 (not shown). The side gap 317 help direct the current 323 away from the second surface 312b (not shown) and the third surface 312c (not shown) of the main pole 312.

FIG. 4B illustrates another cross-sectional view of the magnetic recording head 400 shown in FIG. 4A, according to one embodiment. In the magnetic recording head 400, a trailing shield 320 is disposed in front of the leads 402 in the y-direction in such a way that the trailing shield 320 does not come into contact with the leads 402 or the leading shield 322. The leads 402 are configured to extend above the trailing shield 320 away from the MFS in the z-direction, and extend out above the main pole 312 and trailing shield 320 in the x-direction and/or z-direction.

Figure 4C:
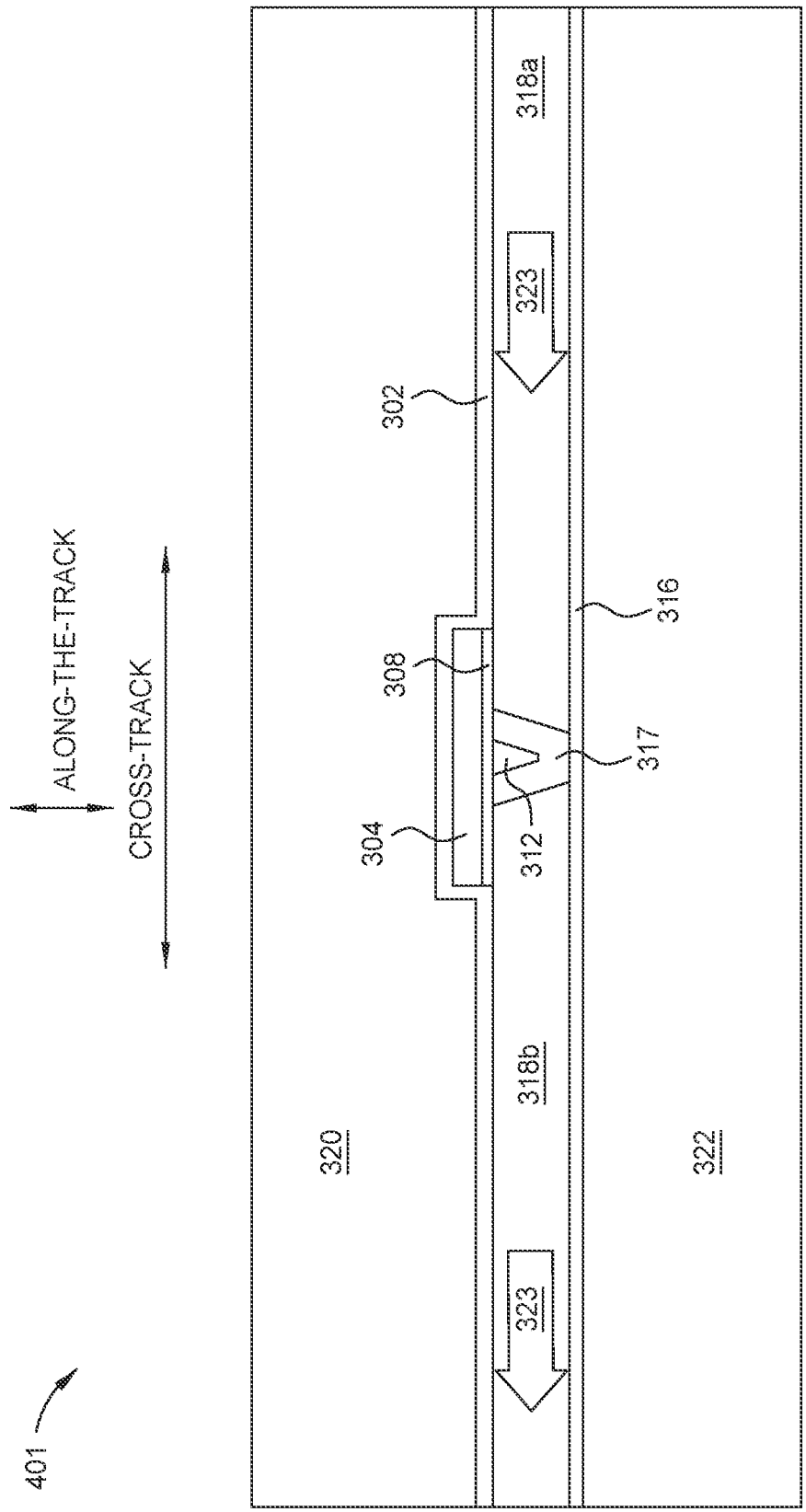

FIGS. 4C and 4D illustrate various views of the electrical potential of a magnetic recording head 401. The magnetic recording head 401 may be the write head 210 of FIG. 2, the magnetic recording head 300 of FIGS. 3A-3C, the magnetic recording head 301 of FIG. 3D, or the magnetic recording head 303 of FIG. 3E. The magnetic recording head 401 may be within a magnetic recording device, such as the magnetic recording device 100 of FIG. 1.

As shown in FIG. 4C, during operation, the magnetic recording head 401 is configured to permit current 323 to flow from the first side shield 318a through the hot seed layer 304, across the first surface 312a (not shown) of the main pole 312, to the second side shield 318b, or to permit current 323 to flow from the second side shield 318b through the hot seed layer 304, across the first surface 312a (not shown) of the main pole 312 to the first side shield 318a. The leads 402 discussed above may be used to apply the current 323 to the magnetic recording head 401. The first insulation layer 302 isolates the trailing shield 320 from the current by directing the current 323 through the side shields 318, into the hot seed layer 304 and over the main pole 312, and away from the trailing shield 320. The second insulation layer 316 isolates the current 323 from the leading shield 322 by directing the current 323 through side shields 318 and away from the leading shield 322. The side gap 317 isolates current 323 from the second surface 312b of the main pole 312, the third surface 312c of the main pole 312, and the fourth surface 312d of the main pole 312. Surfaces 312b-312d are shown per the same orientation in FIG. 3A but not notated here.

As the current 323 is directed through the side shields 318 and the hot seed layer 304, the current 323 is concentrated on the first surface 312a (not shown) of the main pole 312. It is to be understood that although the first insulation layer 302 is shown to be like that of the magnetic recording head 300 of FIGS. 3A-3C, the first insulation layer 302 may alternatively comprise the first and second portions 302b and 302c like the magnetic recording head 301 of FIG. 3D. In which case, although some current 323 would flow through the hot seed layer 304 and into the trailing shield 320, the majority of the current 323 would remain in the hot seed layer 304 and concentrate over the first surface 312a (not shown) of the main pole 312.

FIG. 4D illustrates another view of the electrical potential of the magnetic recording head 401 as shown in FIG. 4C. During operation, the magnetic recording head 401 is configured to permit flow of a current 323 from the first lead 402a across the first surface 312a (not shown) of the main pole 312 and through the second lead 402b, or permit flow of the current 323 from the second lead 402b across the first surface 312a (not shown) of the main pole 312 and through the first lead 402a.

Figure 5A:
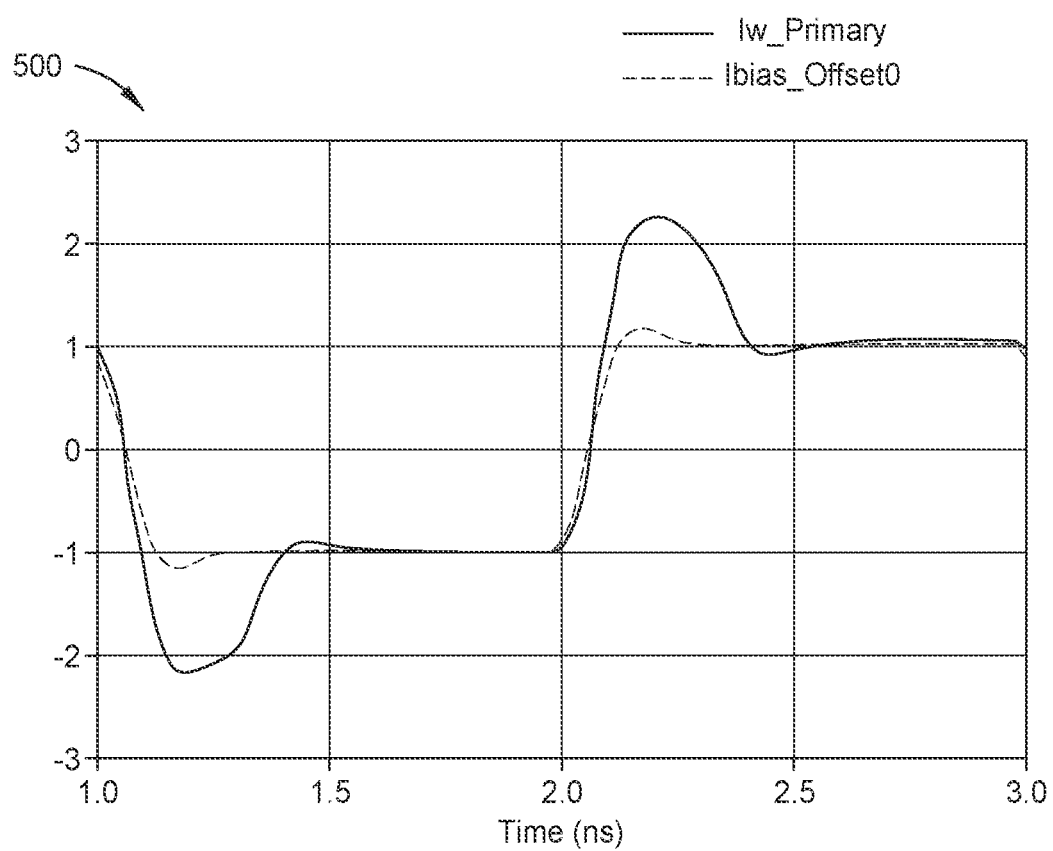
FIGS. 5A and 5B illustrate graphs showing a current scaling factor relative to time, according to various embodiments.
Figure 5B:
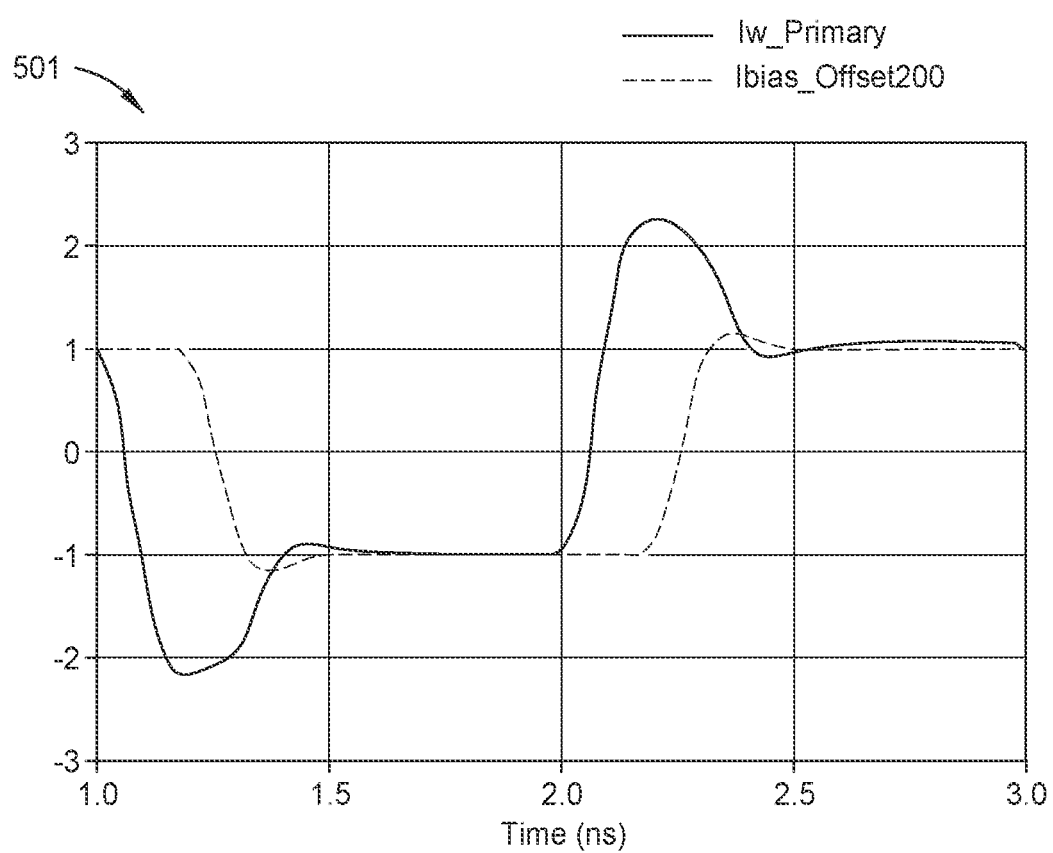

FIGS. 5A and 5B illustrate graphs 500, 501, respectively, showing the effect of a current scaling factor of the current 323 of FIGS. 3A-4D relative to time, according to various embodiments. As shown in FIG. 5A, lw_Primary, represents a current (I) flowing through the write head (w) (lw), applied at a certain time. For example, FIG. 5A illustrates a current lw_Primary of about 20 milliampere (mA) to about 120 mA being applied at time 1 nanosecond (ns) when the write head operates at 1 gigabit per second (Gb/s). However, the time may change when a certain frequency is applied. As time progresses, lw_Primary decreases by a certain scaling factor, for example −2, then increases to an equal but positive scaling factor, for example +2, before leveling out. Ibias_Offset0 represents the current 323 flowing through a magnetic recording head such as the magnetic recording head 300 as illustrated in FIG. 3A-3C, the magnetic recording head 301 as illustrated in FIG. 3D, the magnetic recording head 303 as illustrated in FIG. 3E, or the magnetic recording head 401 as illustrated in FIG. 4C-4D. A current of about 1 mA to about 45 mA is applied to the magnetic write head, as represented by Ibias_Offset0, at time 1 ns so that the current of Ibias_Offset0 is synchronized with the current of lw_Primary. As such, when the current of lw_Primary decreases or increases by a certain scaling factor, the current of Ibias_Offset0 also decreases or increase by a similar scaling factor at the same time.

As shown in FIG. 5B, Ibias_Offset200 represents the same current as Ibias_Offset0; however, in this instance the current applied to the Ibias_Offset200 is delayed in time relative to the current applied to lw_Primary. For example the current applied to the Ibias_Offset200 is delayed by approximately 200 picoseconds (ps) from the current applied to the lw_Primary. As such, the Ibias_Offset200 is still synchronized with the lw_Primary current but the changes in amperage of the Ibias_Offset200 are seen 200 ps after that of the lw_Primary.

By implementing a cross-track current flow in the trailing gap and hot seed layer over the main pole, a field seen by the writer is produced resulting in better write head saturation and reduced write field jitter.

In one embodiment, a magnetic recording head comprises a main pole, a trailing gap disposed above a first surface of the main pole, a hot seed layer disposed above the trailing gap, wherein the hot seed layer has a first length, a first side shield disposed adjacent to a second surface of the main pole, a second side shield disposed adjacent to a third surface of the main pole, a first insulation layer disposed above the hot seed layer, wherein the first insulation layer has a second length greater than or equal to the first length of the hot seed layer, a trailing shield disposed above the first insulation layer, a second insulation layer disposed below the first side shield and the second side shield, and a leading shield disposed below the second insulation layer.

A blocker layer is disposed in contact with the first surface of the main pole, wherein the blocker layer has a thickness of about 1 nm to about 10 nm. The first insulation layer has a thickness of about 10 nm to about 20 nm. The second insulation layer has a thickness of about 10 nm to about 20 nm. The first side shield has a throat height of about 50 nm to about 150 nm. The second side shield has a throat height of about 50 nm to about 150 nm. The hot seed layer has a throat height equal to or less than a throat height of the trailing shield, wherein the throat height of the hot seed layer is about 200 nm to about 500 nm, and wherein the trailing shield has a throat height of about 250 nm to about 500 nm. The magnetic recording head further comprises a heat sink disposed in contact with the second surface of the main pole, the third surface of the main pole, and a fourth surface of the main pole, and a side gap disposed adjacent to the second surface of the main pole, the third surface of the main pole, and the fourth surface of the main pole. The trailing gap comprises a non-magnetic, electrically conductive material selected from the group consisting of: Ru, Cu, NiCr, CuAgNi, Ta, Au, a layer of an alloy thereof, and a multilayer thereof. A magnetic recording device comprising the magnetic recording head. The magnetic recording device, wherein, during operation, a current is configured to flow from the first side shield through the hot seed layer to the second side shield, or from the second side shield through the hot seed layer to the first side shield.

In another embodiment, a magnetic recording head comprises a main pole disposed at a media facing surface, a trailing shield comprising a hot seed layer disposed adjacent to a first surface of the main pole at the media facing surface, a first side shield disposed adjacent to a second surface of the main pole, a first lead disposed adjacent to the first side shield, wherein the first lead is recessed a first distance from the media facing surface and set a second distance away from a third surface of the main pole, a second side shield disposed adjacent to a fourth surface of the main pole, and a second lead disposed adjacent to the second side shield, wherein the second lead is recessed a third distance from the media facing surface and spaced a fourth distance away from the second surface of the main pole, wherein during operation, the first lead and the second lead are configured to flow a current from the first side shield through the hot seed layer to the second side shield, or from the second side shield through the hot seed layer to the first side shield.

The first distance is about 50 nm to about 500 nm from the media facing surface. The third distance is about 50 nm to about 500 nm from the media facing surface. The second distance is about 500 nm to about 2,500 nm from the second surface of the main pole. The fourth distance is about 500 nm to about 2,500 nm from the third surface of the main pole. The first lead has a first flare angle of about 10 degrees to about 45 degrees relative to the media facing surface. The second lead has a flare angle of about 10 degrees to about 45 degrees relative to the media facing surface. The first lead and the second lead are configured to extend above the trailing shield in the z-direction away from the media facing surface. A magnetic recording device comprising the magnetic recording head.

In yet another embodiment, a magnetic recording head comprises a main pole, a blocker layer disposed in contact with a first surface of the main pole, a first side shield disposed adjacent to a second surface of the main pole, a second side shield disposed adjacent to a third surface of the main pole, a hot seed layer disposed above the blocker layer, the first side shield, and second side shield, wherein the hot seed layer comprises, a first overhang portion along a cross-track direction, and a second overhang portion along a cross-track direction, a first insulation layer comprising a first portion disposed adjacent to the first overhang portion, and a second portion disposed adjacent to the second overhang portion, a trailing shield disposed above the hot seed layer and the first insulation layer, a second insulation layer disposed below the first side shield and the second side shield, wherein the second insulation layer has a greater length than the first insulation layer, and a leading shield disposed below the second insulation layer.

The first portion of the first insulation layer extends from a first point disposed above the first side shield along a cross track direction to a second point. The second portion of the first insulation layer extends from a third point disposed above the second side shield along the cross track direction to a fourth point. The hot seed layer contacts the trailing shield between the first and second portions of the first insulation layer. A heat sink is disposed in contact with the second surface of the main pole, the third surface of the main pole, and a fourth surface of the main pole. The heat sink is further disposed in contact with the leading shield. A current is configured to flow from the first side shield through the hot seed layer and the trailing shield to the second side shield, or from the second side shield through the hot seed layer and the trailing shield to the first side shield. A magnetic recording device comprising the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole;
   a trailing gap disposed over a first surface of the main pole;
   a hot seed layer disposed over the trailing gap, the trailing gap being disposed between the first surface of the main pole and the hot seed layer at a media facing surface, wherein the hot seed layer has a first length in a cross-track direction at the media facing surface;
   a first side shield disposed adjacent to a second surface of the main pole;
   a second side shield disposed adjacent to a third surface of the main pole;
   a first insulation layer disposed over the hot seed layer, wherein the first insulation layer has a second length greater than or equal to the first length of the hot seed layer in the cross-track direction at the media facing surface;
   a trailing shield disposed over the first insulation layer;
   a second insulation layer disposed adjacent to the first side shield and the second side shield; and
   a leading shield disposed adjacent to the second insulation layer.

2. The magnetic recording head of claim 1, wherein a blocker layer is disposed in contact with the first surface of the main pole, and wherein the blocker layer has a thickness of about 1 nm to about 10 nm.

3. The magnetic recording head of claim 1, wherein the first insulation layer has a thickness of about 10 nm to about 20 nm, and wherein the second insulation layer has a thickness of about 10 nm to about 20 nm.

4. The magnetic recording head of claim 1, wherein the first side shield has a throat height of about 50 nm to about 150 nm, and wherein the second side shield has a throat height of about 50 nm to about 150 nm.

5. The magnetic recording head of claim 1, wherein the hot seed layer has a throat height equal to or less than a throat height of the trailing shield, wherein the throat height of the hot seed layer is about 200 nm to about 500 nm, and wherein the throat height of the trailing shield is about 250 nm to about 500 nm.

6. The magnetic recording head of claim 1, wherein the magnetic recording head further comprises:
   a heat sink disposed in contact with the second surface of the main pole, the third surface of the main pole, and a fourth surface of the main pole; and
   a side gap disposed adjacent to the second surface of the main pole, the third surface of the main pole, and the fourth surface of the main pole.

7. The magnetic recording head of claim 1, wherein the trailing gap comprises a non-magnetic, electrically conductive material selected from the group consisting of: Ru, Cu, NiCr, CuAgNi, Ta, Au, a layer of an alloy thereof, and a multilayer thereof.

8. A magnetic recording device comprising the magnetic recording head of claim 1.

9. The magnetic recording device of claim 8, wherein, during operation, a current is configured to flow from the first side shield through the hot seed layer to the second side shield, or from the second side shield through the hot seed layer to the first side shield.

10. A magnetic recording head, comprising:
    a main pole disposed at a media facing surface;
    a trailing shield comprising a hot seed layer disposed adjacent to a first surface of the main pole at the media facing surface;
    a first side shield disposed adjacent to a second surface of the main pole;
    a first lead disposed adjacent to the first side shield, wherein the first lead is recessed a first distance from the media facing surface and set a second distance away from a third surface of the main pole;
    a second side shield disposed adjacent to a fourth surface of the main pole; and
    a second lead disposed adjacent to the second side shield, wherein the second lead is recessed a third distance from the media facing surface and spaced a fourth distance away from the fourth surface of the main pole, wherein during operation, the first lead and the second lead are configured to flow a current from the first side shield through the hot seed layer to the second side shield, or from the second side shield through the hot seed layer to the first side shield.

11. The magnetic recording head of claim 10, wherein the first distance is about 50 nm to about 500 nm from the media facing surface, and wherein the third distance is about 50 nm to about 500 nm from the media facing surface.

12. The magnetic recording head of claim 10, wherein the second distance is about 500 nm to about 2,500 nm from the third surface of the main pole; and wherein the fourth distance is about 500 nm to about 2,500 nm from the fourth surface of the main pole.

13. The magnetic recording head of claim 10, wherein the first lead has a first flare angle of about 10 degrees to about 45 degrees relative to the media facing surface, and wherein the second lead has a flare angle of about 10 degrees to about 45 degrees relative to the media facing surface.

14. The magnetic recording head of claim 10, wherein the first lead and the second lead are configured to extend above the trailing shield away from the media facing surface.

15. A magnetic recording device comprising the magnetic recording head of claim 10.

16. A magnetic recording head, comprising:
a main pole;
a blocker layer disposed in contact with a first surface of the main pole at a media facing surface;
a first side shield disposed adjacent to a second surface of the main pole;
a second side shield disposed adjacent to a third surface of the main pole;
a hot seed layer disposed over the blocker layer, the first side shield, and the second side shield at the media facing surface, wherein the hot seed layer comprises:
　a first overhang portion extending in a cross-track direction over the first side shield; and
　a second overhang portion extending in the cross-track direction over the second side shield;
a first insulation layer disposed at the media facing surface, the first insulation layer comprising:
　a first portion disposed adjacent to the first overhang portion; and
　a second portion disposed adjacent to the second overhang portion;
a trailing shield disposed over the hot seed layer and the first insulation layer;
a second insulation layer disposed adjacent to the first side shield and the second side shield, wherein the second insulation layer has a greater length than the first insulation layer; and
a leading shield disposed adjacent to the second insulation layer.

17. The magnetic recording head of claim 16, wherein the first portion of the first insulation layer extends from a first point disposed above the first side shield in the cross track direction to a second point, wherein the second portion of the first insulation layer extends from a third point disposed above the second side shield in the cross track direction to a fourth point, and wherein the hot seed layer contacts the trailing shield between the first and second portions of the first insulation layer.

18. The magnetic recording head of claim 16, wherein a heat sink is disposed in contact with the second surface of the main pole, the third surface of the main pole, and a fourth surface of the main pole, and wherein the heat sink is further disposed in contact with the leading shield.

19. The magnetic recording head of claim 16, wherein a current is configured to flow from the first side shield through the hot seed layer and the trailing shield to the second side shield, or from the second side shield through the hot seed layer and the trailing shield to the first side shield.

20. A magnetic recording device comprising the magnetic recording head of claim 16.

* * * * *